(12) United States Patent  
Huang

(10) Patent No.: US 8,923,657 B2  
(45) Date of Patent: Dec. 30, 2014

(54) ELECTRO-OPTIC MODULATOR

(71) Applicant: Hon Hai Precision Industry Co., Ltd., New Taipei (TW)

(72) Inventor: Hsin-Shun Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 61 days.

(21) Appl. No.: 13/736,957

(22) Filed: Jan. 9, 2013

(65) Prior Publication Data

US 2014/0169722 A1 Jun. 19, 2014

(30) Foreign Application Priority Data

Dec. 19, 2012 (TW) ................ 101148292 A

(51) Int. Cl.
- G02F 1/01 (2006.01)
- G02F 1/225 (2006.01)

(52) U.S. Cl.
CPC ..................... *G02F 1/225* (2013.01)
USPC .................................. 385/2; 385/8

(58) Field of Classification Search
CPC .............. G02F 1/0316; G02F 1/225
USPC ................................ 385/1–3, 8–11
See application file for complete search history.

(56) References Cited

U.S. PATENT DOCUMENTS

| | | | |
|---|---|---|---|
| 4,502,037 A * | 2/1985 | Le Parquier et al. | 341/111 |
| 4,807,952 A * | 2/1989 | Jaeger et al. | 385/8 |
| 4,866,406 A * | 9/1989 | Minakata et al. | 359/315 |
| 5,347,601 A * | 9/1994 | Ade et al. | 385/3 |
| 5,790,719 A * | 8/1998 | Mitomi et al. | 385/2 |
| 6,069,729 A * | 5/2000 | Gill et al. | 359/245 |
| 6,172,791 B1 * | 1/2001 | Gill et al. | 359/249 |
| 6,384,955 B2 * | 5/2002 | Tada et al. | 359/248 |
| 6,721,085 B2 * | 4/2004 | Sugiyama et al. | 359/322 |
| 6,738,174 B1 * | 5/2004 | Hill et al. | 359/245 |
| 6,867,901 B2 * | 3/2005 | Sugiyama et al. | 359/322 |
| 7,095,543 B1 * | 8/2006 | Hill et al. | 359/254 |
| 7,373,025 B2 * | 5/2008 | Ohmori | 385/2 |
| 8,050,524 B2 * | 11/2011 | Shiraishi | 385/14 |
| 8,582,927 B1 * | 11/2013 | Thaniyavarn | 385/2 |
| 2002/0085811 A1 * | 7/2002 | Kambe | 385/41 |
| 2002/0131745 A1 * | 9/2002 | Azarbar | 385/129 |
| 2002/0141679 A1 * | 10/2002 | Dol et al. | 385/2 |
| 2002/0146190 A1 * | 10/2002 | Doi et al. | 385/14 |
| 2002/0154843 A1 * | 10/2002 | Betts | 385/2 |
| 2003/0016896 A1 * | 1/2003 | Azarbar et al. | 385/2 |
| 2003/0147581 A1 * | 8/2003 | Doi et al. | 385/14 |

(Continued)

*Primary Examiner* — Mark Robinson  
*Assistant Examiner* — Zachary A Nemtzow  
(74) *Attorney, Agent, or Firm* — Novak Druce Connolly Bove + Quigg LLP

(57) ABSTRACT

An electro-optic modulator includes a substrate including a top surface, a Y-shaped waveguide embedded into the top surface and including a first branch dedicated for transmitting transverse electric wave and a second branch dedicated for transmitting transverse magnetic wave, a ground electrode, a first modulating electrode, and a second modulating electrode. The top surface defines a first groove separating the first branch and the second branch, a second groove, and a third groove at a side of the second branch opposite to the first groove. The first modulating electrode and the ground electrode are located two sides of the first branch. The first modulating electrode covers a first sidewall of the second groove adjacent to the first branch. The ground electrode entirely covers the first groove and the second branch. The second modulating electrode covers a bottom surface of the third groove.

11 Claims, 2 Drawing Sheets

(56) References Cited

U.S. PATENT DOCUMENTS

| | | | |
|---|---|---|---|
| 2003/0194164 A1* | 10/2003 | Doi et al. | 385/3 |
| 2004/0184755 A1* | 9/2004 | Sugiyama et al. | 385/129 |
| 2005/0013545 A1* | 1/2005 | Kambe | 385/41 |
| 2005/0047704 A1* | 3/2005 | Ohtake | 385/3 |
| 2005/0175271 A1* | 8/2005 | Sugiyama et al. | 385/3 |
| 2005/0196092 A1* | 9/2005 | Enokihara et al. | 385/2 |
| 2006/0029319 A1* | 2/2006 | Sugiyama | 385/1 |
| 2006/0056766 A1* | 3/2006 | Sugiyama | 385/40 |
| 2006/0115196 A1* | 6/2006 | Feke et al. | 385/2 |
| 2006/0140530 A1* | 6/2006 | Kim et al. | 385/8 |
| 2006/0147145 A1* | 7/2006 | Shinriki et al. | 385/3 |
| 2006/0210212 A1* | 9/2006 | Sugiyama | 385/3 |
| 2008/0031564 A1* | 2/2008 | Sugiyama | 385/9 |
| 2008/0044124 A1* | 2/2008 | Sugiyama | 385/3 |
| 2009/0297087 A1* | 12/2009 | Kawano et al. | 385/2 |
| 2009/0324156 A1* | 12/2009 | Kinpara et al. | 385/2 |
| 2009/0324165 A1* | 12/2009 | Sugiyama | 385/14 |
| 2010/0034496 A1* | 2/2010 | Oikawa et al. | 385/2 |
| 2010/0046880 A1* | 2/2010 | Oikawa et al. | 385/2 |
| 2010/0046881 A1* | 2/2010 | Oikawa et al. | 385/2 |
| 2010/0209040 A1* | 8/2010 | Kawano et al. | 385/2 |
| 2010/0232736 A1* | 9/2010 | Ichikawa et al. | 385/2 |
| 2010/0310206 A1* | 12/2010 | Kawano et al. | 385/2 |
| 2010/0329600 A1* | 12/2010 | Sugiyama | 385/2 |
| 2013/0308892 A1* | 11/2013 | Huang | 385/2 |
| 2013/0343692 A1* | 12/2013 | Huang | 385/2 |
| 2014/0169722 A1* | 6/2014 | Huang | 385/3 |

* cited by examiner

ELECTRO-OPTIC MODULATOR

BACKGROUND

1. Technical Field

The present disclosure relates to integrated optics, and particularly to an electro-optic modulator.

2. Description of Related Art

Electro-optic modulators, such as Mach-Zehner electro-optic modulators, change a refractive index of a branch of a Y-shaped waveguide (hereinafter the second branch) using a modulating electric field, utilizing electro-optic effect. Thus, the modulator can alter a phase of lightwaves traversing the second branch. As a result, the lightwaves traversing the second branch have a phase shift and thus interfere with lightwaves traversing another branch of the Y-shaped waveguide (hereinafter the first branch). An output of the Y-shaped waveguide is modulated as the output depends on the phase shift, which in turn depends on the modulating electric field. However, a bandwidth of the electro-optic modulators is often less than satisfactory.

Therefore, it is desirable to provide an electro-optic modulator, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
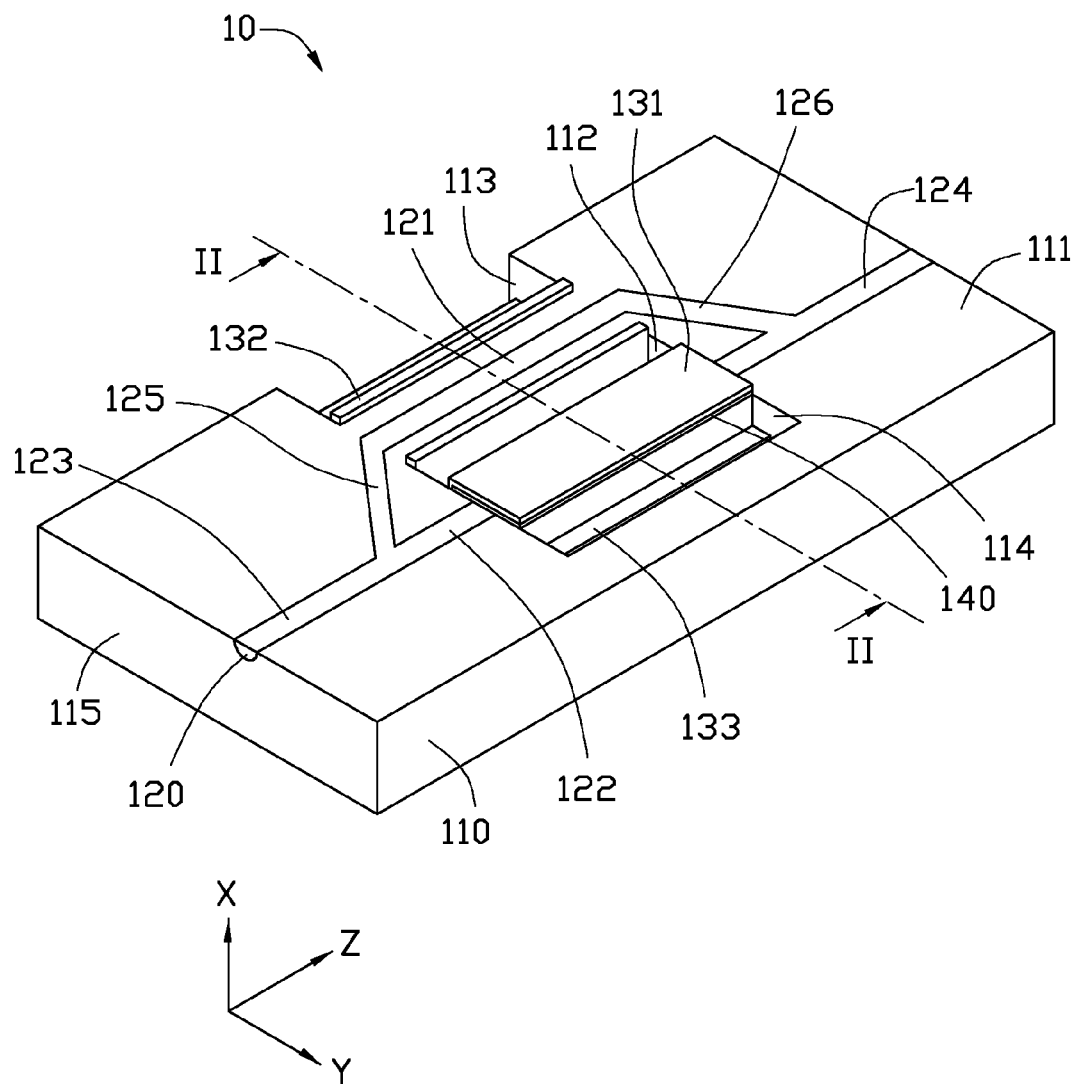
FIG. 1 is an isometric schematic view of an electro-optic modulator, according to an embodiment.
Figure 2:
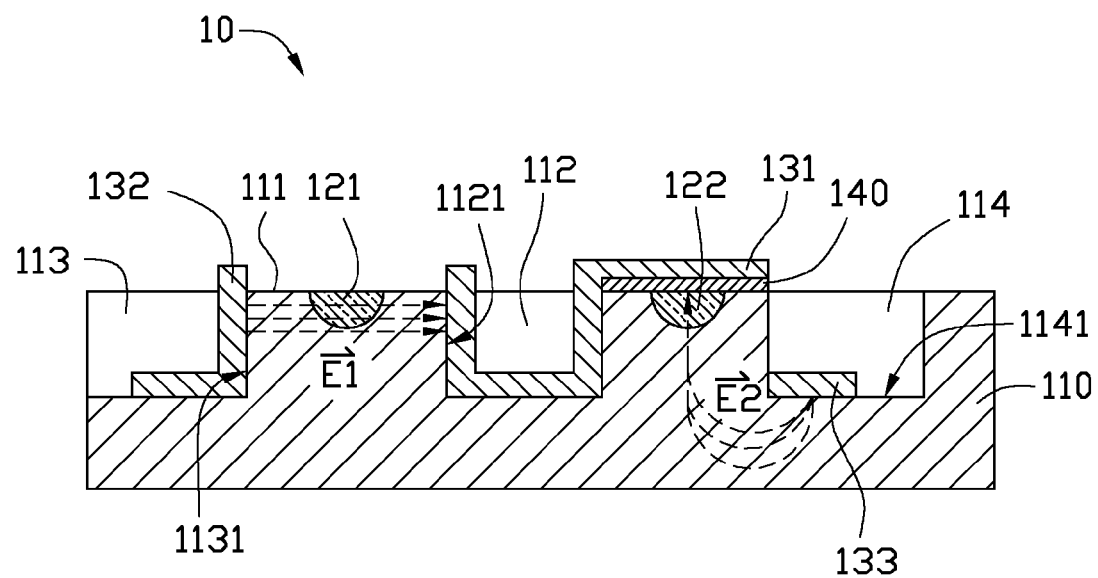
FIG. 2 is a cross-sectional view taken along a line II-II of FIG. 1.

Referring to FIGS. 1-2, an electro-optic modulator 10, according to an embodiment, includes a substrate 110, a Y-shaped waveguide 120, a ground electrode 131, a first modulating electrode 132, and a second modulating electrode 133.

The substrate 110 includes a top surface 111.

The Y-shaped waveguide 120 is embedded into the top surface 111, and includes a first branch 121 and a second branch 122. The first branch 121 is dedicated for transmitting transverse electric wave (TE mode) and the second branch 122 is dedicated for transmitting transverse magnetic wave (TM mode). That is, the first branch 121 only transmits the TE mode and the second branch 122 only transmits the TM mode.

The substrate 110 defines a first groove 112, a second groove 113, and a third groove 114, all of which are rectangular and parallel with the first branch 121, and are aligned with and as long as the first branch 121. The first groove 112 is positioned between the first branch 121 and the second branch 122, separating the first branch 121 and the second branch 122. The second groove 113 is positioned at a side of the first branch 121 opposite to the first groove 112. The third groove 114 is positioned at a side of the second branch 122 opposite to the first groove 112.

The ground electrode 131, the first modulating electrode 132, and the third modulating electrode 133 are all strip-shaped and arranged parallel with the first branch 121 and the second branch 122, and are aligned with and as long as the first branch 121. The first modulating electrode 132 and the ground electrode 131 are located at two sides of the first branch 121. The first modulating electrode 132 is positioned in the second groove 113, and covers a first sidewall 1131 of the second groove 113 adjacent to the first branch 121. The ground electrode 131 entirely covers the first groove 112 and the second branch 122. The second modulating electrode 133 is positioned in the third groove 114 and covers portion of a bottom surface 1141 of the third groove 114, that is, the second modulating electrode 133 is located at a side of the second branch 122 opposite to the first branch 121.

As such, the first branch 121 and the second branch 122 can simultaneously be modulated with different signals (for example, signals in form of different modulating voltages can be applied to the first modulating electrode 132 and the second modulating electrode 133), a bandwidth of the electro-optic modulator 10 is increased.

In addition, crosstalk between the first branch 121 and the second branch 122 is avoided as the TE and TM modes do not interfere with each other, and the first groove 112 provides a barrier against lightwaves crossing over.

Finally, the first modulating electrode 132 and the second modulating electrode 133 share the same ground electrode 131, providing simplicity in the electrode arrangements.

In a coordinate system XYZ (see FIG. 1), wherein X axis is a height direction of the substrate 110 (i.e., perpendicular to the top surface 111), V axis is a width direction of substrate 110 (parallel with the top surface 111 and perpendicular to the first branch 121), and Z axis is a length direction of the substrate 110 (i.e., along the first branch 121), the TE mode has an electric field component $\vec{E}y$ vibrating along the Y axis only. The TM mode has an electric field component $\vec{E}x$ vibrating along the X axis and a $\vec{E}z$ vibrating along the Z axis.

The ground electrode 131 covers a sidewall 1121 of the first groove 112 as the ground electrode 131 entirely covers the first groove 112. As such, a portion of a first modulating electric field $\vec{E}1$, which is generated between the first modulating electrode 132 and the ground electrode 131, interacts with the first branch 121 and is substantially parallel with the Y axis, and thus can effectively modulate the TE mode. A portion of a first modulating electric field $\vec{E}2$, which is generated by the second electrode 133 and the ground electrode 131, interacts with the second branch 122 and is substantially parallel with the X axis, and thus can effectively modulate the TM mode.

The substrate 110 is made of lithium niobate ($LiNbO_3$) crystal to increase a bandwidth of the electro-optic modulator 10 as the $LiNbO_3$ crystal has a high response speed. In this embodiment, the substrate 110 is rectangular and includes a side surface 115 perpendicularly connecting the top surface 111.

In addition to the second branch 122 and the first branch 121, the Y-shaped waveguide 120 includes an input section 123 and an output section 124. The second branch 122 and the first branch 121 branch from the input section 123 and are converged into the output section 124. The input section 123, the second branch 122, and the output section 124 cooperatively form a straight passage for the lightwaves. The first branch 121 is substantially parallel with the second branch 122. The Y-shaped waveguide 120 also includes a branching section 125 and a converging section 126 which obliquely connect the first branch 121 to the input section 123 and the output section 124. A divergent angle between the branching section 125 and the second branch 122 is substantially equal to a divergent angle between the converging section 126 and the second branch 122.

The input section 123 is perpendicular to the side surface 115. The input section 123 and the output section 124 are formed by diffusing titanium into the substrate 110 (Ti:LiNbO$_3$) and can transmit both the TE mode and the TM mode. The second branch 122 is formed by diffusing titanium into the substrate 110 and then further diffusing zinc-nickel alloy into the substrate 110, and can only transmit the TE mode. The first branch 121, the branching section 125, and the converging section 126 are formed by diffusing titanium into the substrate 110 and then further diffusing Gallium into the substrate 110, and can only transmit the TM mode.

The ground electrode 131, the first modulating electrode 132, and the second modulating electrode 133 are aligned with and as long as the first groove 112, the second groove 113, and the third groove 114.

To avoid lightwaves being absorbed by the ground electrode 131, the electro-optic modulator 10 further includes a buffer layer 140 sandwiched between the top surface 111 and the ground electrode 131. The buffer layer 140 can be made of silicon dioxide.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An electro-optic modulator, comprising:
   a substrate comprising a top surface;
   a Y-shaped waveguide implanted into the top surface and comprising a first branch and a second branch, the first branch being dedicated for transmitting transverse electric wave and the second branch being dedicated for transmitting transverse magnetic wave;
   a ground electrode;
   a first modulating electrode; and
   a second modulating electrode;
   wherein the substrate defines a first groove, a second groove, and a third groove in the top surface, the first groove is positioned between the first branch and the second branch, spacing the first branch and the second branch, the second groove is positioned at a side of the first branch opposite to the first groove, the third groove is positioned at a side of the second branch opposite to the first groove, the first modulating electrode and the ground electrode are located at two sides of the first branch, the first modulating electrode is positioned in the second groove and covers a first sidewall of the second groove adjacent to the first branch, the ground electrode entirely covers the first groove and the second branch, and the second modulating electrode is positioned in the third groove and covers a bottom surface of the third groove.

2. The electro-optic modulator of claim 1, wherein the substrate is made of lithium niobate.

3. The electro-optic modulator of claim 2, wherein the Y-shaped waveguide comprises an input section, an output section, a branching section, and a converging section, the second branch and the first branch are branched from the input section and converge into the output section, all of the input section, the second branch, and the output section cooperatively form a straight passage for lightwaves, the first branch is substantially parallel with the second branch, the branching section and the converging section obliquely connect the first branch to the input section and the output section, and a divergent angle between the branching section and the second branch is substantially equal to a divergent angle between the converging section and the second branch.

4. The electro-optic modulator of claim 3, wherein the substrate comprises a side surface perpendicularly connecting to the top surface, and the input section is substantially perpendicular to the side surface.

5. The electro-optic modulator of claim 3, wherein the ground electrode, the first modulating electrode, and the second modulating electrode are all strip-shaped and arranged parallel with the first branch and the second branch, and are as long as and aligned with the first branch.

6. The electro-optic modulator of claim 3, wherein the first groove, the second groove, and the third groove are rectangular and parallel with the first branch, and are as long as and aligned with the first branch.

7. The electro-optic modulator of claim 3, wherein the input section and the output section are formed by diffusing titanium into the substrate.

8. The electro-optic modulator of claim 3, wherein the second branch is formed by diffusing titanium into the substrate and then further diffusing zinc-nickel alloy into the substrate.

9. The electro-optic modulator of claim 3, wherein the first branch, the branching section, and the converging section are formed by diffusing titanium into the substrate and then further diffusing Gallium into the substrate.

10. The electro-optic modulator of claim 1, further comprising a buffer layer sandwiched between the top surface and the ground electrode.

11. The electro-optic modulator of claim 10, wherein the buffer layer is made of silicon dioxide.

* * * * *